United States Patent [19]

Genieès et al.

[11] Patent Number: 4,629,540

[45] Date of Patent: Dec. 16, 1986

[54] PROCESS FOR THE PREPARATION OF POLYANILINES, POLYANILINES OBTAINED ACCORDING TO THIS PROCESS AND THEIR USES IN THE PRODUCTION OF ELECTROCHEMICAL GENERATORS

[75] Inventors: Eugène Genieès, St. Egreve; Gérard Pierre, Eybens; Christian Santier, Grenoble; Constantin Tsintavis, St. Martin d'Héres, all of France

[73] Assignee: Commissariat a l'Energie Atomique, Paris, France

[21] Appl. No.: 698,183

[22] PCT Filed: May 4, 1984

[86] PCT No.: PCT/FR84/00124

§ 371 Date: Jan. 7, 1985

§ 102(e) Date: Jan. 7, 1985

[87] PCT Pub. No.: WO84/04528

PCT Pub. Date: Nov. 22, 1984

[30] Foreign Application Priority Data

May 6, 1983 [FR] France .................. 83 07958

[51] Int. Cl.[4] .......... C25C 1/00; H01M 4/60
[52] U.S. Cl. .................. 204/59 R; 528/422; 429/212; 429/213
[58] Field of Search ......... 204/59 R, 78; 528/422

[56] References Cited

U.S. PATENT DOCUMENTS 4,488,943 12/1984 Skotheim ..................... 204/78

OTHER PUBLICATIONS

Volkov et al, J. Electroanal. Chem., 115 (1980), pp. 279–291.
Diaz et al, J. Electroanal. Chem., 111 (1980), pp. 111–114.
Ruby, Daniel, "New Promise for the Electric Car: Plastic–Metal Batteries", Popular Science, Feb. 1982, pp. 89–92.
Advanced Battery Technology, vol. 17, No. 11, Nov. 1981, pp. 1–8.

Primary Examiner—John F. Niebling
Attorney, Agent, or Firm—Oblon, Fisher, Spivak, McClelland, & Maier

[57] ABSTRACT

Process for the preparation of polyanilines, polyanilines obtained according to this process and their uses in the production of electrochemical generators.

This process consists of oxidizing a compound chosen from among aniline, para-aminodiphenylamine and their derivatives in a super acid in the liquid phase, having fluoride ions, e.g. in the eutectic $NH_3$, HF, either chemically using an oxidizing agent, or electrochemically.

The polyanilines obtained can be used as a positive electrode material (5) in an electrochemical generator having two current collectors (3) and (7) and a negative electrode material (9), e.g. constituted by lithium or a lithium-aluminum alloy.

7 Claims, 3 Drawing Figures

PROCESS FOR THE PREPARATION OF POLYANILINES, POLYANILINES OBTAINED ACCORDING TO THIS PROCESS AND THEIR USES IN THE PRODUCTION OF ELECTROCHEMICAL GENERATORS

The present invention relates to a process for the preparation of polyanilines more particularly used as the active electrode material of an electrochemical generator.

In the invention, the term polyanilines is understood to mean polymers resulting from the condensation of aniline, as well as that of derivatives thereof.

It is known that polyanilines are used for producing electrochemical batteries (cf e.g. French Pat. No. 1,519,729), but their preparations have poor efficiency levels and lead to compounds containing numerous poorly defined oligomers. This leads to a dispersion of the electrochemical properties and consequently a dispersion of the qualities of the batteries produced therefrom.

Thus, the present invention proposes a process for the preparation of polyanilines having efficiency levels close to the theoretical levels, whilst no secondary oligomer products are formed, which can be used as the active electrode material in a battery.

More specifically, the present invention relates to a process for the preparation of polyanilines, characterized in that a compound chosen from among aniline, para-aminodiphenylamine and derivatives thereof is oxidized in a super acid in the liquid phase containing fluoride ions.

Super acid is understood to mean all acid mixtures, whose equivalent pH is below 0 with reference to water, such as e.g. sulphuric acid, phosphoric acid, hydrofluoric acid, benzene sulphonic acid, etc.

According to a secondary feature of the invention, the concentration of the liquid phase in the compound chosen from among aniline, para-aminodiphenylamine and their derivatives is between $10^{-3}$ and 4 mol/l.

According to another secondary feature of the invention, the liquid phase containing the super acid and the fluoride ions is constituted by the eutectic $NH_3$, HF, which contains approximately 54.2% of free HF and 80.9% of total HF (by weight).

It is also possible to use $RNH_2$, HF mixtures with R representing an alkyl radical and pyridine, HF mixtures.

According to another secondary feature of the invention, the fluoride ion concentration of the liquid phase is 0.5 to 10 ions.g/l. The liquid phase can be an aqueous or organic solution containing the super acid and the fluoride ions.

By mixing the aniline or its derivatives and the super acid containing the fluoride ions, an anilinium fluoride is obtained, whose concentration can vary between $10^{-3}$ and 4 mol/l.

The preparation procedures for the polyanilines are as follows:
firstly, the aniline, para-aminodiphenylamine or one of the derivatives thereof and the super acid solution are mixed;
secondly, oxidation to polyanilines takes place either chemically or electrochemically.

The chemical route involves mixing the preceding solution with a solution in the same super acid of oxidizing agents, such as potassium dichromate, potassium permanganate, osmium tetroxide and ammonium persulphate.

When oxidation takes place chemically, the concentration of aniline, a para-aminodiphenylamine or a derivative of aniline or para-aminodiphenylamine of the super acid solution is such that in the final liquid phase, there is a concentration of $10^{-3}$ to 4 mol/l of aniline, para-aminodiphenylamine or one of their derivatives. In the same way, the concentration of the oxidizing agent in the solution added to the solution of aniline, para-aminodiphenylamine or one of their derivatives is such that in the final liquid phase an oxidizing agent concentration of $10^{-3}$ to 4 mol/l is obtained.

When using the electrochemical route, the polyanilines are electrolytically deposited on a support, such as of platinum, nickel, Monel, carbon or any other carbon-coated support, e.g. a stainless steel support coated with graphite paint. The current densities used for this deposition vary between 0.05 and 100 $mA/cm^2$, polyaniline formation being quantitative. In this way, the electrode of the battery is directly obtained. The polyanilines prepared according to this second procedure are very stable and adhere very strongly to the support (grid or plate).

The polyanilines prepared according to the process of the invention have much better electrochemical properties than other conductive conjugate polymers. Thus, after 1600 complete charging and discharging cycles, the polyaniline-based battery prepared according to the invention still retains 80% of its capacity, whereas other polymers, e.g. polypyrrole lose 20% of their capacity after 100 cycles.

The compounds usable for performing the process according to the invention are in accordance with the general formula:

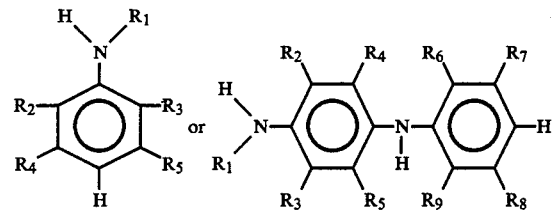

in which $R_1$, $R_2$, $R_3$, $R_4$, $R_5$, $R_6$, $R_7$, $R_8$ and $R_9$, which can be the same or different, represent a hydrogen atom, an aryl or alkyl radical, a group chosen from among $NO_2$, $NH_2$, $CF_3$, $SO_2$, CN, $OCH_3$, Cl, F,

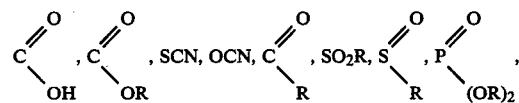

SR (with R=an alkyl or aryl radical) or a radical chosen from among the alkyl and aryl radicals optionally having one or more substituents chosen from the group including $NO_2$, $NH_2$, $CF_3$, SO2, CN, $OCH_3$, Cl, F, SCN, OCN,

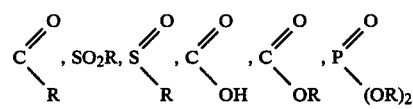

SR, (with R=an alkyl or aryl radical).

When the positive electrode active material is a polyaniline, the negative electrode active material can be constituted by a reactive metal such as lithium, by a conductive conjugate polymer, by carbon, or by a composite material such as a ceramic material (tin oxide), (indium oxide, titanium oxide doped with fluorine or antimony). Preferably, use is made of a reactive metal such as lithium and lithium-aluminium alloys.

The electrolytes associated with the aforementioned electrodes and used for producing a generator utilizing a polyaniline prepared according to the invention are preferably lithium salts, such as perchlorate, perborate and hexafluorophosphate. Nevertheless, it is possible to use sodium hexafluorophosphate, tetramethyl ammonium fluoborate, tetramethyl ammonium chloride, tetraethyl ammonium fluoride or tetrabutyl ammonium fluoride. The electrolytes are dissolved in a solvent such as linear ethers (e.g. dimethoxyethane), cyclic ethers (e.g. dioxolane or tetramethylhydrofuran) or esters (e.g. propylene carbonate). Obviously, the electrolytes or solvents can be used alone or in mixed form.

The electrolyte concentrations in the solvent are dependent on the choice of each of these. In the case of lithium perchlorate and propylene carbonate, the concentration of the salt in the solvent is 1 to 3 mol/l.

With reference to the attached drawings, other advantages add features of the present invention can be better gathered from reading the following nonlimitative, illustrative description.

Figure 1:
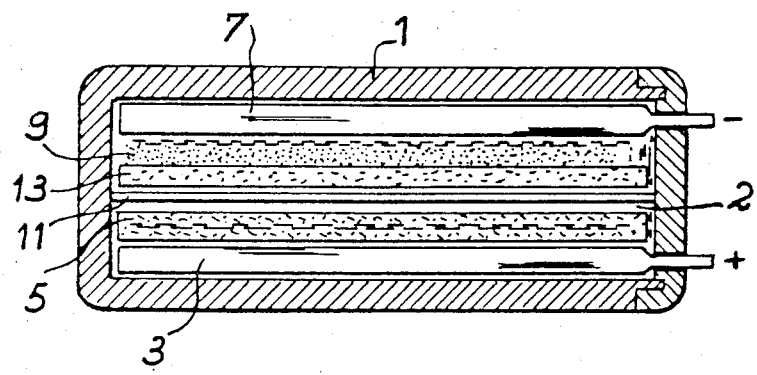
FIG. 1 shows in sectional form a generator charged with polyaniline.

On referring to FIG. 1, it is pointed out that an electrochemical generator comprises a tight, insulating case 1 containing an electrolyte 2. This case contains a first current collector 3 covered by a positive active material 5 and a collector 7 in contact with a negative active material 9. Separators 11 and 13 can be provided to prevent short-circuits. Obviously, several unitary electrochemical batteries or generators can be used for forming a series or parallel arrangement.

In FIG. 1, the polyethylene case or box 1 has a first Monel collector 3, which is covered by an approximately 100 $\mu$m thick polyaniline layer 5, which is obtained in accordance with the following conditions.

50 cc of super acid constituted by the eutectic $NH_3$, HF, to which is added 0.5 cc of aniline are introduced into a reactor. Into the bath obtained is placed a 40 $cm^2$ Monel electrode facing a nickel electrode and a constant current of 1 $mA/cm^2$ is applied for 1 hour. The Monel anode, which has become intensely black as a result of the deposition of 60 mg of polyaniline is washed with water, acetone and then propylene carbonate. A membrane of Nafion (R) 11 and a mineral fibre fabric 13 are placed in case 1, together with a second stainless steel collector 7 on which is deposited by electrolysis a lithium layer 9, which acts as the negative active material. The separator 11 and/or 13 can also be constituted by other ion exchange membranes, microporous Teflon, paper, glass wool, membranes made from polymers, e.g. polyethylene, polypropylene, etc. The case is then filled with an electrolyte formed from a molar lithium perchlorate solution in propylene carbonate and is then sealed. The thus formed generator has an electromotive force of 3.5 V with a currrent density of approximately 10 $mA/cm^2$.

Collectors 3 and 7 are in the form of a grid or plate.

Figure 2:
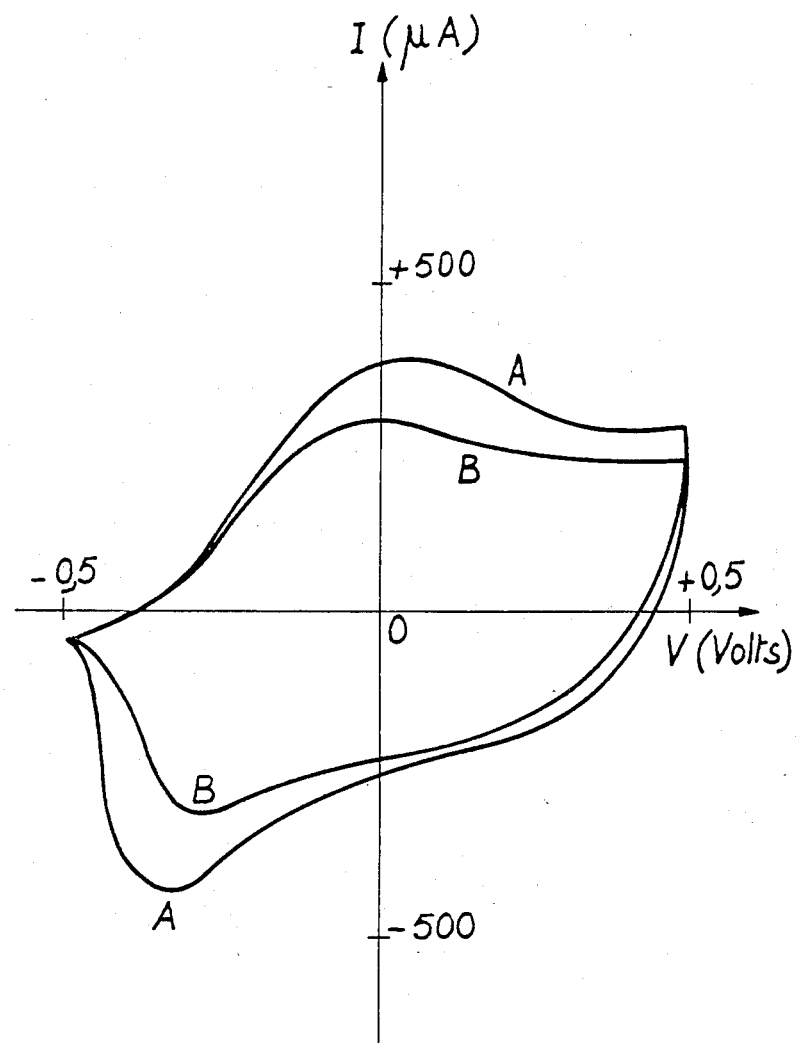
FIG. 2 shows the cyclic voltametric curves of polyaniline.

FIG. 2 shows two cyclic voltametric curves obtained with a scanning rate of 0.1 $Vs^{-1}$ of an electrode covered with 0.1 $\mu$m of polyaniline in acetonitrile containing 0.1M lithium perchlorate.

These curves were recorded by using a PAR 173 potentiostat, the potentials being checked relative to a $Ag/Ag^{+}10^{-2}M$ reference electrode. Curves A and B were respectively obtained after 10 and 1600 scans. On examining the curve, it can be seen that the electrical characteristics deteriorate only slightly as a result of the number of scans.

Figure 3:
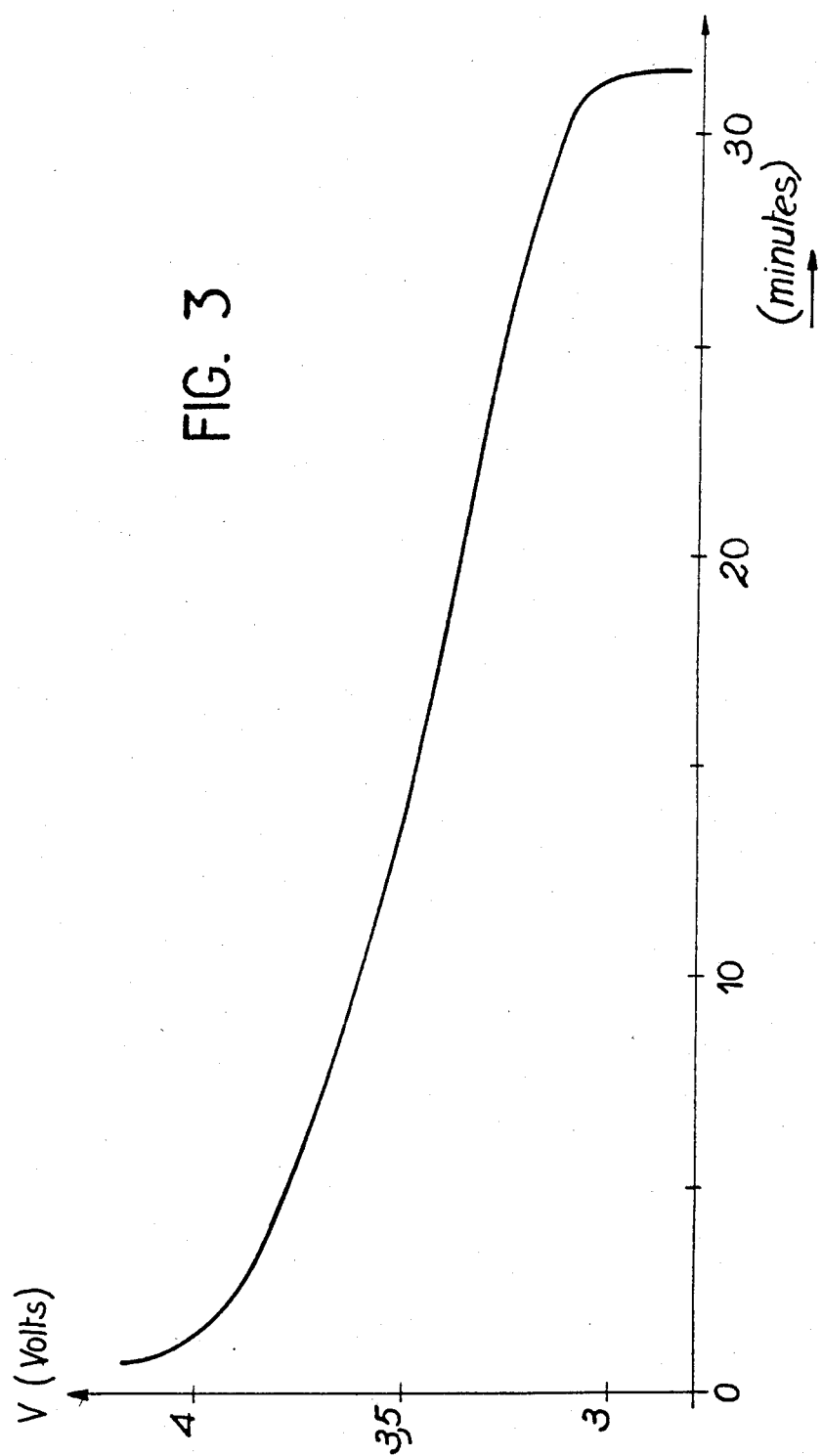
FIG. 3 shows the discharge curve of a constant intensity generator.

Finally, FIG. 3 shows the discharge curve of a polyaniline/lithium generator at a constant intensity of 30 $\mu$A, the positive electrode having a surface of 1 $cm^2$ and is covered with an approximately 2 $\mu$m polyaniline layer.

In the same way as hereinbefore, an electrochemical generator is produced having polyaniline as the positive electrode active material and a lithium-aluminium alloy as the negative electrode material.

Polyaniline is deposited electrochemically under the same conditions as hereinbefore using 14000 C for depositing the polyaniline on a graphite support of surface area 448 $cm^2$.250 cc of propylene carbonate containing 1 mol/l of $LiClO_4$ are used as the electrolyte. The characteristics of the generator obtained in this way are as follows:

capacity: 2,700 C,
cycling: 25 cycles at 80% depth,
cycling currents: 500, 1000, 2000 $\mu A/cm^2$,
maximum current: 4.5A,
mass capacity: 126 Ah/kg,
self-discharge: 2.6 mV/h,
voltage: 3.4 V,
internal resistance: 0.26$\Omega$.

Using another electrochemical generator having as the positive electrode active material polyaniline obtained by the process according to the invention and as the negative electrode active material a lithium-aluminium alloy, with the electrolyte constituted by propylene carbonate containing 1 mol/l of $LiClO_4$, the following results were obtained:

mass capacity: 140 Ah/kg,
maximum capacity on discharge: 15 $C/cm^2$,
short-circuit current: 18 $mA/cm^2$,
cycles:
 100 $\mu$A for 45 h,
 0.5 mA for 8½ h,
 1 mA for 4 h,
 2 mA for 100 min,
voltage: 3.2 to 3.4 V,
self-discharge
 1 to 2 mV/h with separator,
 2 mV/h without separator.

We claim:

1. A process for the synthesis of a polyaniline, comprising:
   (a) mixing aniline, p-aminodiphenylamine or derivative thereof and a super acid in the liquid phase containing fluoride ions; and
   (b) electrochemically oxidizing the reaction mixture, thereby preparing said polyaniline.

2. The process of claim 1, wherein said aniline, p-aminodiphenylamine or derivative thereof is a compound of the formula:

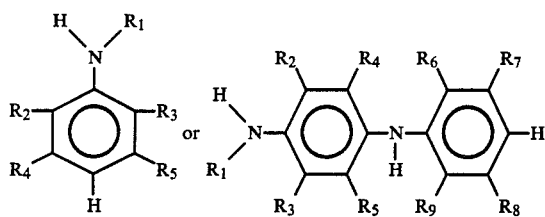
or
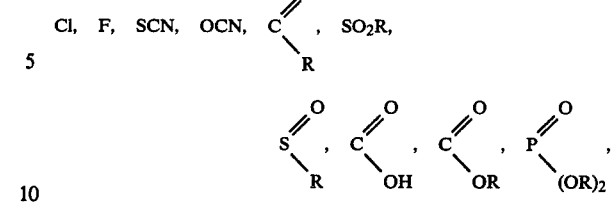

wherein $R_1$, $R_2$, $R_3$, $R_4$, $R_5$, $R_6$, $R_7$, $R_8$ and $R_9$, each of which can be the same or different, are hydrogen, aryl or alkyl or a substituent selected from the group consisting of $NO_2$, $NH_2$, $CF_3$, $SO_2$, $CN$, $OCH_3$, Cl, F,

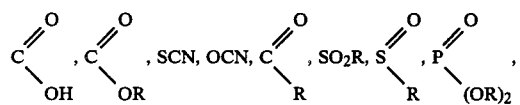

and SR, wherein R is aryl or alkyl, or alkyl or aryl each substituted by at least one substituent selected from the group consisting of $NO_2$, $NH_2$, $CF_3$, $SO_2$, $CN$, $OCH_3$, Cl, F, SCN, OCN, SR, wherein R is as defined above.

3. The process of claim 1, wherein said fluoride ion concentration in the liquid phase ranges from 0.5 to 10 ions.g/l.

4. The process of claim 1, wherein the concentration of said aniline, p-aminodiphenylamine or derivative thereof in the said liquid phase ranges from $10^{-3}$ to 4 mole/l.

5. The process of claim 1, wherein said liquid phase containing said super acid and the fluoride ions is the eutectic of $NH_3$ and HF.

6. The process of claim 1, wherein the electrochemical oxidation of said reaction mixture is conducted at a current density varying between 0.05 and 100 mA/cm².

7. A polyaniline prepared by the process of claim 1.

* * * * *

UNITED STATES PATENT AND TRADEMARK OFFICE
CERTIFICATE OF CORRECTION

PATENT NO. : 4,629,540

DATED : December 16, 1986

INVENTOR(S) : Genies, et al.

It is certified that error appears in the above-identified patent and that said Letters Patent is hereby corrected as shown below:

On the Title Page:

--First inventor's name is misspelled.
   It should read

Eugene Genies, St. Egreve...--

Signed and Sealed this

Twenty-first Day of April, 1987

Attest:

DONALD J. QUIGG

Attesting Officer

Commissioner of Patents and Trademarks